(No Model.)
C. E. CHAMBERLAND.
FILTER.
No. 519,664. Patented May 8, 1894.
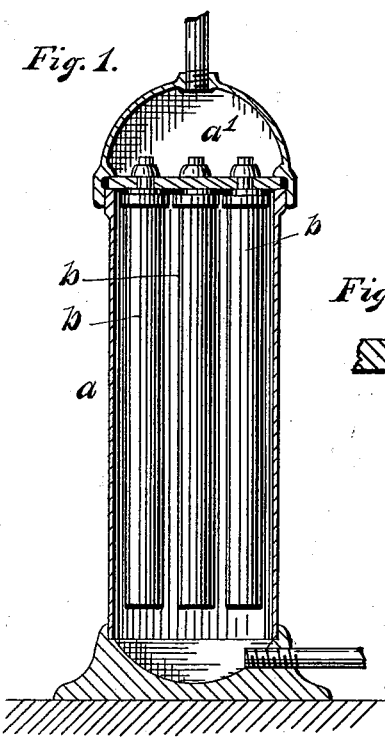
Fig. 1.
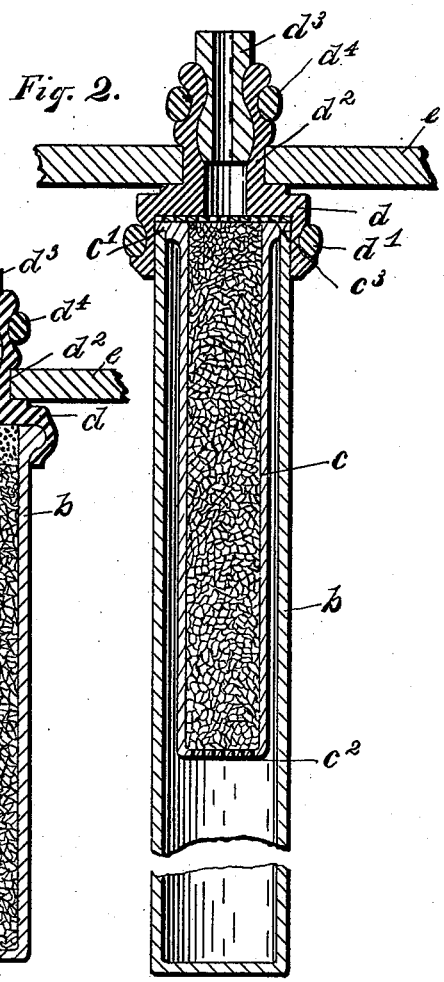
Fig. 2.
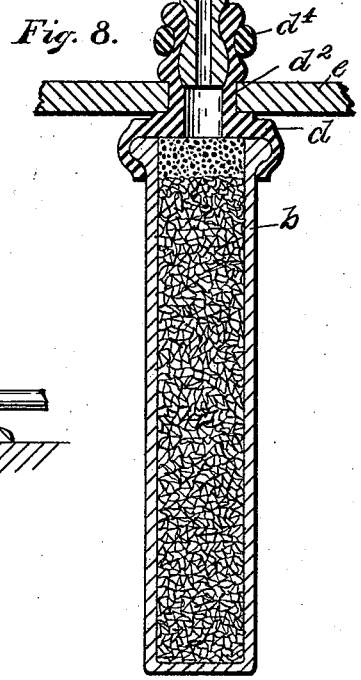
Fig. 8.
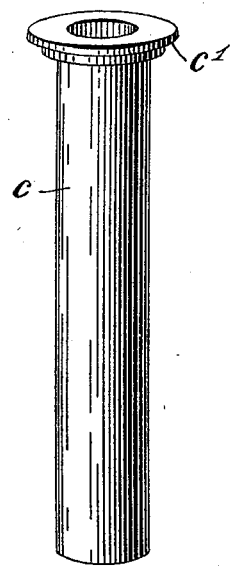
Fig. 3.
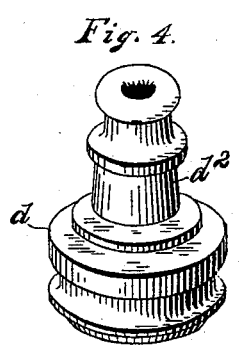
Fig. 4.
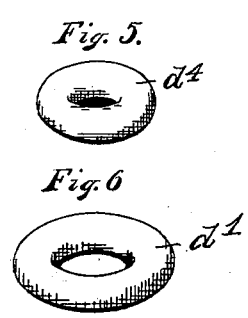
Fig. 5.
Fig. 6.
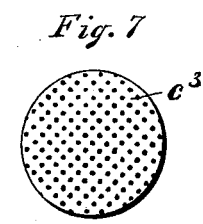
Fig. 7.
Witnesses
H. O. Osten.
Frank Watt.
Inventor
Charles E. Chamberland
By his Attorneys
Stauffer and Shepherd

UNITED STATES PATENT OFFICE.

CHARLES EDOUARD CHAMBERLAND, OF PARIS, FRANCE.

FILTER.

SPECIFICATION forming part of Letters Patent No. 519,664, dated May 8, 1894.

Application filed August 29, 1892. Serial No. 444,472. (No model.) Patented in France December 17, 1886, No. 180,324, and April 7, 1892, No. 220,748.

*To all whom it may concern:*

Be it known that I, CHARLES EDOUARD CHAMBERLAND, a citizen of the Republic of France, residing at Paris, France, have invented certain new and useful Improvements in Filters, (for which I have secured Letters Patent in France, No. 180,324, dated December 17, 1886, with certificate of addition April 8, 1892, and No. 220,748, dated April 7, 1892,) of which the following is a specification.

My invention relates to improvements in filters, and it especially relates to that class of filters in which the filtration is accomplished through a porous earthenware substance, generally known as the "Système Pasteur."

The object of my invention is to provide a filtering apparatus in which a chemical as well as a physical purification is effected, by first passing the water through the porous earthenware and then through charcoal or other form of carbon.

A further object of my invention is to provide new and novel means for retaining the carbon in its proper relation to the porous earthenware filter.

A further object of my invention is to provide a novel arrangement of the porous filtering medium and connection therefor.

I attain these objects in the apparatus illustrated in the accompanying drawings, in which—

Figure 1 is a sectional elevation of a filter embodying my invention, in which a series of filtering tubes of porous earthenware are employed. Fig. 2 is a sectional elevation, on a larger scale, of one of the filtering tubes. Fig. 3 is a detail view in perspective of the carbon receptacle preferably employed in connection with the tube. Fig. 4 is a detail view, in perspective of my improved cap or filtering connection for the tube. Figs. 5 and 6 are detail views of retaining rings preferably used in connection with the same. Fig. 7 is a detail view of a shield or strainer preferably employed in connection with the carbon receptacle. Fig. 8 is a sectional view of the filtering tube, showing a modification in the arrangement.

Like parts are represented by similar letters of reference in the several views.

In the accompanying drawings, $a$ represents the outer casing which incloses the filtering tubes $b$. These filtering tubes $b$ are formed of porous earthenware, so that the water or other liquid admitted into the casing $a$, is filtered by passing through the walls of the said tube and thence discharged from the inside of said tube into a separate chamber or reservoir $a'$, connected to the outer casing. When these filtering tubes are composed of the compound heretofore patented to me, in which a fine granular material is mixed with a plastic clay and suitably baked, a perfect physical purification is effected. It becomes necessary, however in some cases not to stop at a physical purification even though it is a perfect one, but to employ means which will also produce a chemical purification, to remove or destroy all organic matter in solution in the water, in order that a complete and successful result may be obtained. To this end, I employ in connection with the filtering tube, carbon preferably in the form of charcoal which is placed within the filtering tube in such a manner that the water which filters through the walls of said tube and is thus completely purified physically, passes through the carbon or charcoal, so as to chemically purify the water by removing or destroying the organic matter in solution. I preferably accomplish this object by the use of a second non-porous tube $c$, adapted to be inserted in the filtering tube $b$, and preferably provided with projecting shoulders or flanges $c'$, which rest on the top of said filtering tube, with the body of the tube $c$ projecting into the filtering tube $b$. This non-porous tube $c$, is filled with charcoal or other suitable form of carbon, and is perforated at the bottom, as shown at $c^2$, by perforations sufficiently fine, to retain the carbon, but permit the water or other liquid to be filtered to pass into the tube. A plate $c^3$ similarly perforated is preferably employed at the top of the tube $c$, to prevent the charcoal from passing out at the top with the filtrate. The porous filtering tube $b$ is preferably formed open at the top to receive the perforated tube or carbon receptacle $c$, the parts being held together and the top of the outer porous filtering tube being completely sealed to prevent the escape of the filtrate except through the carbon, by means of a flexible cap $d$, preferably of rubber and adapted to fit over the top of the filtering tube on which it is held by an outer encircling ring $d'$ or in any other suitable manner. This cap $d$ is provided with a projecting end or nipple $d^2$ adapted to pass through a suitable perforation in a plate $e$, or division wall between the inclosing chamber $a$ and the receiving chamber or reservoir $a'$, the neck or nipple $d^2$ being perforated to permit the discharge of the filtrate through the same and firmly secured in the perforated wall $e$, in any suitable manner, preferably by means of a perforated plug $d^3$ adapted to project into the perforated nipple, so as to distend the same into the opening through the wall $e$, the perforated nipple being preferably swelled at the lower end and held into the nipple by the elasticity of the rubber, which may be supplemented by an elastic ring $d^4$ placed on the outside of the same. By the above construction, it will be seen that all the water or other liquid which passes through the porous walls of the filtering tube, is caused to pass also through the carbon contained in the receptacle $c$. By means of the improved cap and connection, the tubes may be readily removed at any time for cleaning, or otherwise, by simply withdrawing them from said cap, which remains secured in the plate or wall $e$, the tube being readily replaced in the said cap and held therein by the elasticity of the walls of said cap, which, in most cases, will be found sufficient. If the retaining ring $d'$ is employed, this ring may be removed from the cap and placed on the tube below the cap. When the tube is replaced in the cap, the elastic ring may be replaced on the outer periphery of the cap, which is preferably grooved slightly to receive the same. It is obvious that the same result may be accomplished, though not to the same degree, by placing the carbon or charcoal directly into the filtering tube $b$, as shown in Fig. 8, a sponge or other suitable form of porous medium being placed at the top of the tube to prevent the carbon from passing out with the filtrate, the connecting cap $d$ being employed as before.

It is obvious that the apparatus herein described admits of various modifications in its constructions, I do not, therefore, limit myself to the exact constructions shown and described, but

I claim as my invention—

1. In a filter, a porous filtering tube, and an elastic cap for said tube, said cap being provided with an extended neck or nipple adapted to project into an opening in a perforated plate, and means, substantially as described, for securing said cap in said opening to cause the filtrate from said tube to pass through said plate, substantially as specified.

2. In a filter, the combination with a porous filtering tube, of a cap or cover to fit over and partially close the end of said tube, said cap being provided with an extended neck or nipple adapted to pass through an opening in a perforated plate, and a perforated plug for securing said neck or nipple in said opening, substantially as specified.

3. In a filter, the combination with a porous filtering tube, of an elastic cap or cover to fit over the end of said tube a perforated neck on said cap or cover adapted to fit into an opening in a perforated plate, a perforated plug adapted to be inserted into said neck or nipple, means, substantially as described, for securing said nipple to said plug and the said cap to the filtering tube, substantially as specified.

4. An elastic perforated cap or cover for a porous porcelain filtering tube having downwardly projecting flanges to engage with the end of said tube, an upwardly projecting nipple to extend into an opening in a perforated plate, and means for securing said nipple in said opening and said tube in said cap, substantially as specified.

5. In a filter, a porous, open-ended, earthenware tube, and a cap formed of rubber or other elastic material and provided with a downwardly projecting flange to fit over said tube and having a perforation to permit the escape of the filtrate from said tube, substantially as and for the purpose specified.

6. An elastic perforated cap or cover in combination with a porous filtering tube, said cap being provided with a downwardly extending flange to embrace said tube, and an upwardly extending neck or nipple by means of which it is connected to a perforated plate, a perforated plug for securing said neck or nipple in said perforated plate, and elastic retaining rings to hold said nipple to said plug and said cap to said porous tube, substantially as specified.

In witness whereof I have hereunto set my hand, this 24th day of May, 1892, in presence of two subscribing witnesses.

CHARLES EDOUARD CHAMBERLAND.

Witnesses:
R. H. BRANDON,
ROBT. M. HOOPER.